United States Patent
Spijkerman et al.

(10) Patent No.: US 10,542,724 B2
(45) Date of Patent: Jan. 28, 2020

(54) METHOD AND ARRANGEMENT FOR FILLING OF CHEESE CURD IN MOULDS

(71) Applicant: TETRA LAVAL HOLDINGS & FINANCE S.A., Pully (CH)

(72) Inventors: Harrie Spijkerman, Wapenveld (NL); Lammert Bloemsma, Jakarta Timur (ID); Sikko Ros, St. Annaparochie (NL)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 123 days.

(21) Appl. No.: 15/324,417

(22) PCT Filed: Jul. 6, 2015

(86) PCT No.: PCT/EP2015/065304
§ 371 (c)(1),
(2) Date: Jan. 6, 2017

(87) PCT Pub. No.: WO2016/005306
PCT Pub. Date: Jan. 14, 2016

(65) Prior Publication Data
US 2017/0208770 A1    Jul. 27, 2017

(30) Foreign Application Priority Data

Jul. 7, 2014   (SE) ...................... 1450862

(51) Int. Cl.
*A01J 25/13* (2006.01)
*A01J 25/00* (2006.01)
(Continued)

(52) U.S. Cl.
CPC ............. *A01J 25/13* (2013.01); *A01J 25/002* (2013.01); *A01J 25/111* (2013.01); *A01J 25/112* (2013.01); *A01J 25/12* (2013.01); *A01J 25/15* (2013.01)

(58) Field of Classification Search
CPC ....... A01K 25/13; A01K 25/112; A01J 25/111
(Continued)

(56) References Cited

U.S. PATENT DOCUMENTS 5,195,426 A * 3/1993 Thuli .................... A01J 25/167
                                                        118/425
5,706,719 A * 1/1998 Roumeau ................ A01J 25/12
                                                        426/512
(Continued)

FOREIGN PATENT DOCUMENTS

DE    1 582 944 A1    8/1970
DE    1 582 935 A1    12/1970
(Continued)

OTHER PUBLICATIONS

International Search Report (PCT/ISA/210) dated Oct. 9, 2015, by the European Patent Office as the International Searching Authority for International Application No. PCT/EP2015/065304.
(Continued)

Primary Examiner — Ibrahime A Abraham
Assistant Examiner — Ahmad Abdel-Rahman
(74) Attorney, Agent, or Firm — Buchanan Ingersoll & Rooney PC (57) ABSTRACT

A device for filling cheese curd into a pressing mould comprising a curd distributor, having an inlet end through which cheese curd may be received, and an outlet end through the cheese curd may exit the curd distributor, a pressing-mould holder arranged below the outlet of the curd distributor, one or more drive units, configured to perform a relative motion between the curd distributor and the pressing mould holder in accordance with a selected number of motion patterns, a control unit, configured to control the
(Continued)

motion pattern based on input comprising an identifier of a pressing-mould configuration positioned by the pressing-mould holder.

13 Claims, 5 Drawing Sheets

(51) Int. Cl.
*A01J 25/11* (2006.01)
*A01J 25/12* (2006.01)
*A01J 25/15* (2006.01)

(58) Field of Classification Search
USPC .......................................... 99/456, 458, 453
See application file for complete search history.

(56) References Cited

U.S. PATENT DOCUMENTS

| | | | | |
|---|---|---|---|---|
| 5,752,434 | A | * | 5/1998 | Kuan ...................... A01J 25/12 100/116 |
| 6,401,603 | B1 | * | 6/2002 | Palm ..................... A23C 3/0375 99/452 |
| 2003/0083770 | A1 | * | 5/2003 | Williamson ........... A21B 7/005 700/117 |
| 2010/0263551 | A1 | * | 10/2010 | Pavero .................. A01J 25/008 99/348 |

FOREIGN PATENT DOCUMENTS

| | | | |
|---|---|---|---|
| DE | 71 19 729 U | 8/1971 | |
| DE | 38 11 522 A1 | 10/1988 | |
| DE | 3811522 A1 * | 10/1988 | .............. A01J 25/12 |
| EP | 0 242 930 A2 | 10/1987 | |
| EP | 0242930 A2 * | 10/1987 | .............. A01J 25/12 |
| EP | 1 769 676 A1 | 4/2007 | |
| FR | 2 202 642 A1 | 5/1974 | |
| FR | 2 613 179 A1 | 10/1988 | |
| FR | 2 637 771 A1 | 4/1990 | |
| FR | 2 779 318 A1 | 12/1999 | |

OTHER PUBLICATIONS

Written Opinion (PCT/ISA/237) dated Oct. 9, 2015, by the European Patent Office as the International Searching Authority for International Application No. PCT/EP2015/065304.

Office Action dated Jan. 21, 2015, by the Swedish Patent Office in Swedish Application No. 1450862-6 (6 pgs).

* cited by examiner

METHOD AND ARRANGEMENT FOR FILLING OF CHEESE CURD IN MOULDS

TECHNICAL FIELD

Embodiments herein relate to cheese manufacturing and in particular to an improved method and device for filling of cheese curd in moulds.

BACKGROUND

In a traditional cheese-manufacturing process, cheese curd is filled into moulds.

Different approaches for this are used, some examples are listed.

Manually fill and distribute curd particles by hand, for example at traditional cheese making at dairy farms or artisan cheese-production facilities.

Direct fill curd and whey mixture or pre-drained curd into moulds in so called final press systems distributing curd and whey (or pre-drained curd) over a spread of moulds and as such distributing the curd-whey over the moulds. At end filling moving the curd on top of the moulds into the moulds. After curd filling close the moulds with lids and press the curd to cheeses in the moulds.

Direct fill whey and curd into the mould and use the mould also as draining unit. The whey is required to distribute and place the curd inside the mould.

Another example is pre-formation and compacting of a curd bed in a so called drainage column or drainage bed. The compacted curd bed is cut into curd blocks which are transferred into moulds.

When filling a mould with curd resulting in an evenly distributed curd bed in the mould and even height curd beds in case of multi moulds in combination with a wide range of possible shapes of moulds, for example varying from large single moulds for round or rectangular shaped cheese till multi-moulds for small cheeses in round, rectangular, oval or any shape required, is proven to be a problematic feature of curd in mould filling systems. Most systems have significant limitations in one or more aspects.

SUMMARY

In order to at least mitigate drawbacks as discussed above, a system has been invented which supports evenly distributed curd in a mould or in multi-mould suited for a wide range of cheese formats. According to a first aspect the present disclosure relates to a device for filling cheese curd into a pressing mould, or mould configuration. The device comprises a curd distributor, having an inlet end through which cheese curd may be received, and an outlet end through which the cheese curd may exit the curd distributor. Furthermore there is a pressing-mould holder arranged below the outlet of the curd distributor, and one or more drive units, configured to perform a relative motion between the curd distributor and the pressing mould holder in accordance with a selected number of motion patterns. The device also comprises a control unit, configured to control the motion pattern based on input comprising an identifier of a pressing-mould configuration positioned by the pressing-mould holder.

A device having such features will provide a versatile cheese production for a number of setups.

The relative motion may be effected in more than one way. According to one embodiment at least the outlet end of the curd distributor is movable in one spatial dimension orthogonal to a gravitational force acting on the cheese curd leaving the outlet thereof. This approach leaves it open to allow for the remainder the movement (the other dimension) to either be unwanted or provided by movement of the mould configuration.

In one or more embodiments at least the outlet end of the curd distributor is movable in two spatial dimensions orthogonal to a gravitational force acting on the cheese curd leaving the outlet thereof. In this way the distributor may be used to distribute curd in a plane, i.e., in most mould configurations.

An alternative would be, which is the case for one or more embodiments, that the pressing-mould holder is movable in one or two dimensions residing in a plane orthogonal to a gravitational force acting on the cheese curd leaving the outlet of the curd distributor.

The actual motion of the distributor or the mould holder does not have to be restricted to two dimensions, as long as the two dimensions are included in the movement. For example, a straightforward pendulum moving freely will cover the two dimensions, it will do it by following the surface of a sphere, but the two dimensions will be there. The analogy will make more sense when studying the examples of the detailed description.

In or several embodiments an insert may be arranged between the outlet end of the curd distributor and the pressing-mould holder, the insert mimicking a mould-cavity setup in a pressing-mould configuration positioned by the pressing-mould holder. The insert is used to guide the curd into the mould configuration in a proper way, which is the meaning of "mimicking" in the present context. In most, but not necessarily all, cases this will mean that the insert is divided into at least as many sections as there are mould cavities in the mould configuration. There may be instances of the insert being divided into even more sections, if such an approach is advisable to improve the distribution efficiency.

For the embodiments where there is a motion of the pressing-mould holder during distribution the insert may be configured to follow any motion performed by the pressing-mould holder. The insert generally do not have to follow a motion of the pressing mould holder during insertion and retraction of the mould configuration, since it comes into use during distribution of curd.

In one or more embodiment the delimiters used to divide the insert into sections may have a shape such that they are tapering off towards a flow of curd. This will have the effect of reducing fouling. Basically, it will have the effect that an inlet end of the insert will have openings of a larger cross section than the outlet end thereof.

To further improve the versatility of the device, in one or more embodiments a sluice plate may be arranged between the outlet end of the curd distributor and the pressing-mould holder, the sluice plate comprising on or more retractable portions such that a flow of curd from the outlet end of the curd distributor to a mould configuration positioned by the pressing-mould holder may be blocked or allowed to passed, wherein the sluice plate is controlled to block the flow if a mould configuration is not present. The effect of the sluice plate has been disclosed, yet it may be worth mentioning that the sluice plate may be used without the use of an insert.

In embodiments where both a sluice plate and an insert are used it is preferable that the sluice plate is arranged downstream any insert arranged between the outlet end of the curd distributor and the pressing-mould holder, enabling a continuous flow of curd to the insert and a controlled discontinuous flow into the mould configuration.

It is preferential in one or more embodiments that a supply line for supplying curd to the inlet end of the curd distributor is configured to provide a continuous flow of curd.

Furthermore, in one or more embodiments, and interior surface of the curd distributor may be profiled, e.g. corrugated with ridges running in a vertical direction. This will have the effect of reducing curd build-up that could result in blockages or an uneven flow of curd during a continuous run.

In one or several embodiments the curd distributor has a funnel shape where the inlet end is wider than the outlet end, and is further embodiments the input given to the control unit may comprise a cheese recipe, i.e. information of a machine setup beneficial for a particular cheese type.

According to another aspect all and any of the devices disclosed above and below may also be embodied as methods. According to that aspect the present disclosure may also relate to a method for filling cheese curd into a pressing mould with a device comprising a a curd distributor, having an inlet end through which cheese curd may be received, and an outlet end through which the cheese curd may exit the curd distributor, a pressing-mould holder, arranged below the outlet of the curd distributor, one or more drive units, configured to perform a relative motion between the curd distributor and the pressing mould holder in accordance with a selected number of motion patterns, a control unit, comprising configuring the control unit to control the motion pattern based on input comprising an identifier of a pressing-mould configuration positioned by the pressing-mould holder.

In one or more embodiments the method may also comprise inputting a cheese recipe to the control unit, just to mention some exemplifying combinations.

BRIEF DESCRIPTION OF THE DRAWINGS

FIGS. 4A-C are schematic plan views of mould configurations.

FIG. 4D is a perspective view of a mould configuration corresponding to that of FIG. 4C FIGS. 5A-C illustrate a few examples of inserts corresponding to the mould configuration of FIG. 4C and FIG. 4D.

DETAILED DESCRIPTION

Figure 1:
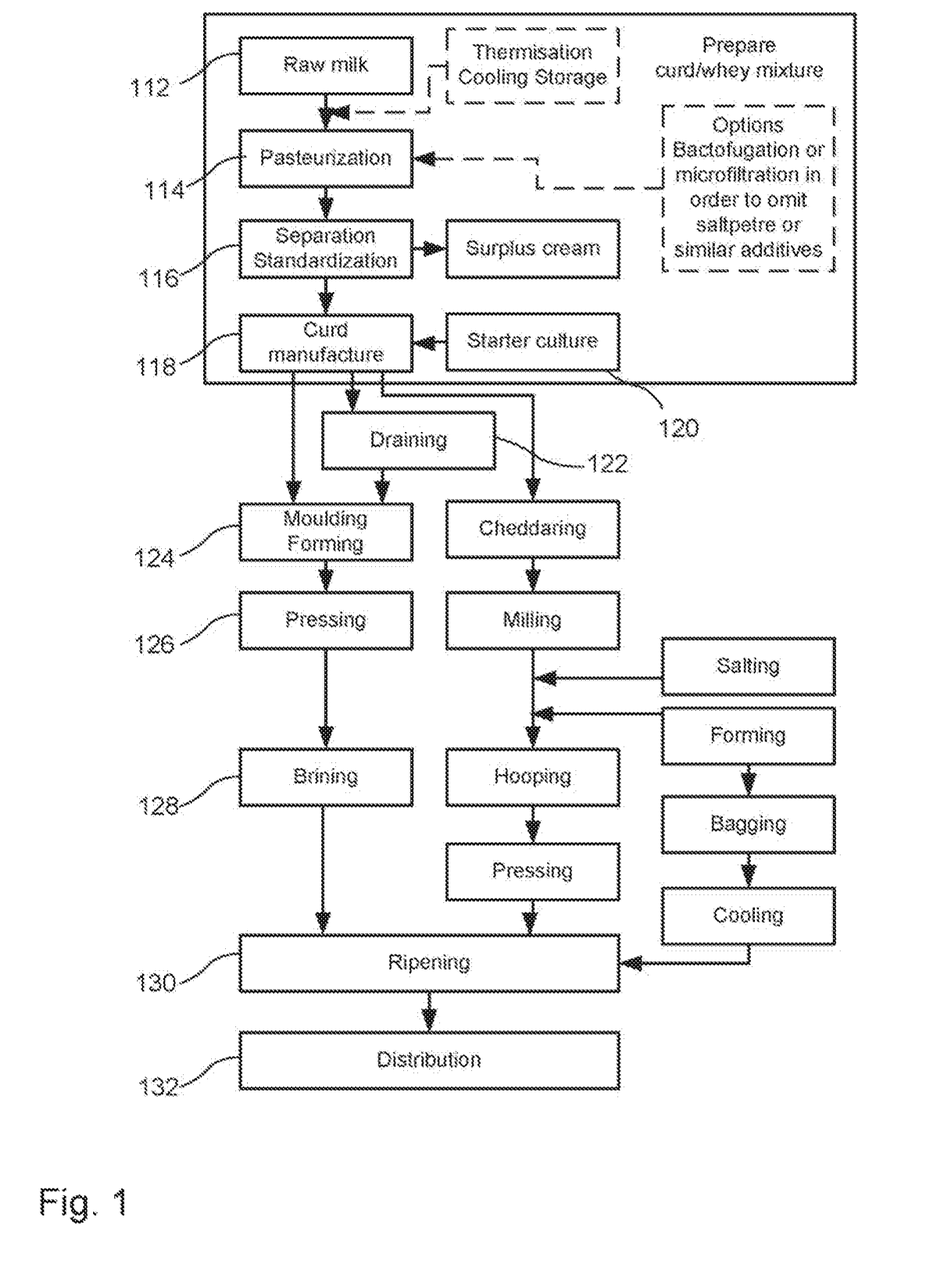
FIG. 1 is a flow scheme illustrating a cheese manufacturing line

FIG. 1 illustrates a flow chart for a typical process of manufacturing cheese, in this particular example (semi-)hard cheese and cheddar cheese. The flow chart is quite complex in that it includes several available optional process steps, and for the purposes of the present invention it is sufficient to consider a portion of the leftmost track (semi-) hard cheese. With that starting point a process of manufacturing a semi-hard cheese may comprise the steps of manufacturing curd (step 118) raw milk (step 112) being pasteurized (step 114) and separated and standardized (step 116) using a starting culture (step 120), rennet, etc, all in accordance with prior art. In a consecutive step 122 the curd is drained, i.e. the whey is removed to the largest extent possible. Cutting of curd into granules of desired size facilitates drainage of whey. Following the draining 122 the curd is arranged in a mould (step 124) fully or partly defining the shape of the cheese, or is formed in another manner. Subsequent steps may include a Pressing step 126, a Brining step 128 and Ripening step 130 before the end product is distributed in step 132.

During the cheese manufacturing process further ingredients may be added in order to affect flavor and texture of the cheese, as well as the shelf life. Common ingredients include salt and spices. There are several ways of adding ingredients, examples including:

Adding ingredients into a large volume of curd and whey, i.e. adding ingredients prior to draining, e.g. adding ingredients at the same time as the curd is cut into granules, or before or after that step. This method will ensure a good mix-in of ingredients, yet there is an apparent risk that a significant amount of ingredients may be washed away in the draining step, resulting in losses. One further effect will be that most of the processing equipment will be contaminated with the ingredient in question, implying that there is an significant amount of cleaning associated with changing of product, even if the change itself is limited to shifting flavours of the cheese.

Adding ingredients inline to a curd-whey mixture as the mixture is pumped over to a draining and forming unit (or at inlet of this unit). If compared with the first technique described this adding procedure has an advantage in that ingredients are dosed into a more concentrated volume of curd and whey in which majority of whey is already removed in prior machinery reducing losses to whey and minimising ingredient fouled whey. The problem associated with change of ingredient, i.e. the cleaning issue, would still be a problem. Also the inline dosing accuracy is more difficult to control.

In a patent application by the present applicant an improved method for ingredient dosing is suggested. The method includes adding the ingredient as partially drained cheese curd is transferred to the pressing mould. Adding ingredients this late in the process provides a significant improvement in terms of cleaning and the losses of ingredients to whey will be reduced significantly. Basically, in a situation where the same base is used different types of cheese could be manufactured by simply shifting the ingredient added.

Returning to particulars of the present disclosure it focusses on step 124, the moulding, where cheese curd is arranged in a mould, The mould is then closed with a moveable mould lid and the mass of curd is pressed, preferably by using a technique provided by the present applicant where the mass of curd is pressed in a highly controlled manner in vacuum and with the aid of air pressure used as a pressure-application force. However, the application of the invention as claimed herein should not be limited to such a narrow use.

Figure 2:
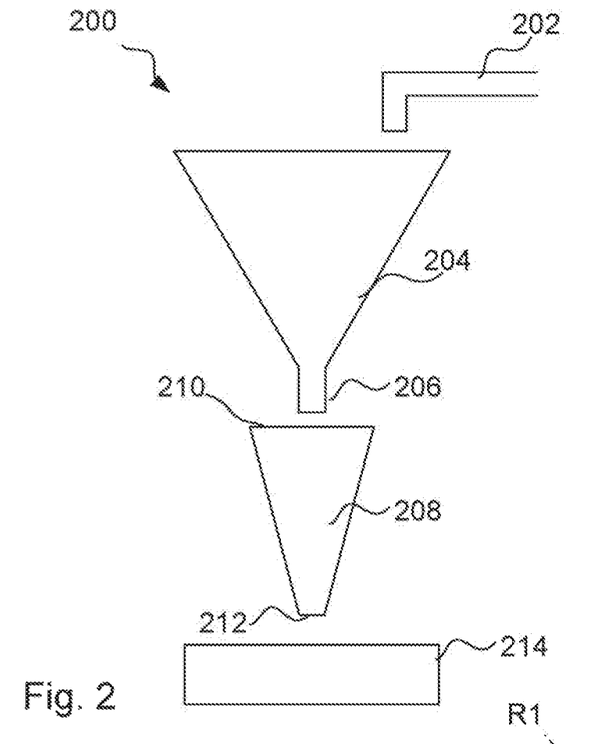
FIG. 2 is a schematic drawing of a curd distribution system according to one embodiment of the present invention.

FIG. 2 illustrates some components relevant for understanding of the present disclosure. A schematic of a portion of cheese line is shown, a portion that may be referred to as a draining and moulding device 200 based on its intended function. A mixture of curd and whey is transported, e.g. via piping 202 to an inlet of a draining device 204. In the present embodiment the draining device comprises a conical perforated screen which may rotate and even vibrate during operation. On its travel through the conical draining device the curd will be separated from the whey in that the free whey will drain through the perforations of the conical draining device while the curd in the form of curd particles will travel down towards the outlet 206 of the conical draining device. Referring to the previous paragraph, there are other ways of separating curd from whey, and though there are advantageous effects connected to the disclosed draining device the particular design should not be considered as essential for the present disclosure. The draining and moulding device 200 is continuously supplied with a curd and whey mixture, and consequently a continuous flow of drained curd leaves the outlet of the draining device.

A curd distribution device 208, "distributor" in the following, is arranged below the draining device 204. There is a beneficial effect in the arrangement, since gravity is the only force needed for the transport of curd particles. This said, the setup could include other types of conveyors if needed for a particular application. The distributor 208 has an inlet end 210 through which it receives the flow of curd from the draining device (when a draining device is included in the setup) and an outlet end 212 through which the flow of curd leaves the curd distribution device 208. For the purpose of reducing fouling the interior of the distributor may be profiled, or rather corrugated in a cross direction relative to the direction of motion of the curd flow.

Furthermore the distributor 208 may have a tapered shape, wherein the inlet end 210 is wider than the outlet end 212. The wider inlet end may ensure that the entire flow of curd will be received even if there should be a relative motion or product splashing, while the smaller outlet end may ensure that the mass of curd leaving the distributor may be distributed with an adequate precision. One measure that may quantify an absolute size of the outlet end is that it should allow for curd to be directed into the smallest mould 214 planned for without spillage, yet if intermediate components are arranged, we will return to this, the dimensions of the outlet could actually exceed the size of the smallest mould.

A cheese mould 214 is arranged below the distributor. Again, the present setup as described takes advantage of gravity as a driving force, yet other solutions are possible. The cheese mould will determine the final shape of the cheese, and depending on cheese-type and preference various mould designs may be utilized. Furthermore, several moulds may be arranged in a mould configuration instead of a single mould. "Mould configuration" as used herein may therefore refer to a single mould and to a configuration where several moulds are used.

Curd flows from the distributor into the mould configuration and once it is filled to the desired degree a new mould configuration replaces the full one. For that reason the mould configuration may be arranged in a mould holder. The mould holder may be reduced to guides controlling the motion of the mould configuration in and out of the correct position, and may even be reduced to guide rails or similar if the only motion required from the mould configuration is that it should get into a filling position before filling and out from the filling position after it has been filled.

Following the filling of curd the mass of curd arranged in the mould configuration will be pressed following a set pressure curve for a set period of time before the cheese is demoulded and forwarded to brining and or ripening or whatever type of processes follows downstream the pressing for that particular type of cheese.

Now, to return to the focus of the present disclosure: if the distribution of curd in the mould is uneven the pressing may not be successful. Imagine a depth profile having a peak in the middle, if the curd mass is not fluid enough that peak will absorb most of the pressing force while the mass to the side of the peak may experience little or no pressure. The resulting cheese may have to be discarded resulting in severe product losses. This may be due to an inappropriate shape or due to an uneven pressing. One approach to resolve this issue is to distribute the curd mass after filling into the mould, by mechanical means or by hand. Another technique that has been used is to overfill the mould configuration and thereafter level the amount of curd with a scraper, so that each mould in a mould configuration is filled to the rim prior to pressing. The present disclosure aims at providing an alternative way of performing this, providing a simplistic method which is efficient both in terms of labour, time and waste.

Again referring to FIG. 2 the present setup relies on that there is a distributor and that the distributor is movable in relation to the mould configuration. One should realize that the relative motion could be obtained by moving either the distributor or the mould configuration (mould holder) or both. In the following description the relative movement is provided by the distributor in isolation but the features to follow could equally well be utilized for one of the other two setups. The distributor may then be driven to move during filling of curd into a mould configuration, wherein an adequate distribution is accomplished. This has several beneficial effects, not only may the curd mass obtain an adequate distribution in the mould but also the distribution is performed during filling, meaning that once filling is stopped the mould configuration is ready for pressing, without any further distribution step.

Figure 3:
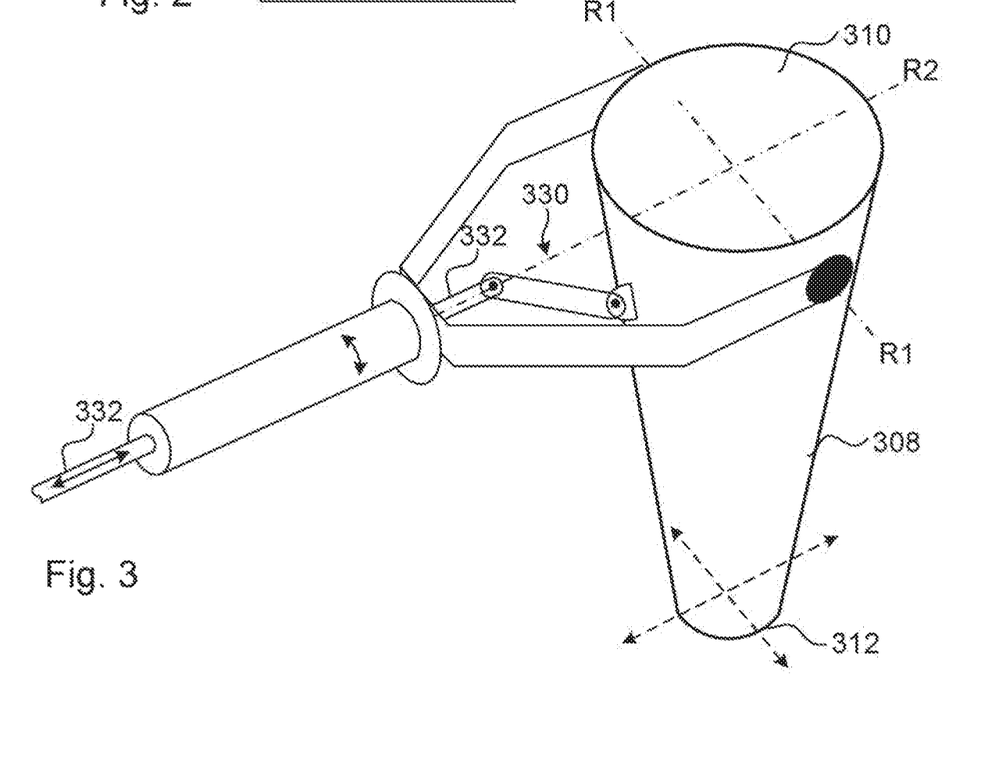
FIG. 3 is a perspective view of a suspension of a curd distributor according to one embodiment thereof.

In this particular embodiment the distributor is pivotally suspended at an upper end thereof, which is shown in in the view of FIG. 3, where the distributor has been given the reference numeral 308 (numbering coherent with the numbering of FIG. 2 yet with an altered initial digit to reflect the number of the drawing). Again, the present configuration is given as an example only, and though having some advantageous effects there will be other ways of suspending the distributor so as to allow of a motion of an outlet thereof, and still there are embodiments where other components such as the cheese mould etc. move instead of, or in combination with, the distributor. Anyway, for the present embodiment the suspension results in that the lower end, comprising the outlet 312, may be moved freely in a plane orthogonal to the flow of curd falling out of the outlet 312 while the movement of the inlet end 310 is quite moderate allowing for a continuous feed of curd. In the present embodiment the plane is curved since the suspension is pivotal. The pivot points enable the distributor to pivot around an axis R1. A linkage 330 coupled to a drive shaft 332 effect the motion around the axis R1. Another drive (not shown) may be arranged to effect a tilt around an axis R2. The movement could be accomplished in many different ways, and shown setup should be construed as schematic and exemplifying only.

The conical shape of the distributor 308 will facilitate an even flow of curd in a situation where the distributor is tilted in relation to a vertical position.

The actual motion may be provided by a pneumatic drive, a hydraulic drive, an electrical drive or any other suitable drive. Presently the preferred solution is the use of servomotors enabling a rapid and versatile motion pattern. The servomotors, or the drive used, are controlled by a control unit. The control unit may preferably comprise a selection of motion patterns preprogrammed for various mould configurations. The control unit may also comprise input means for manual input of motion pattern, or for fine tuning of existing motion patterns. In any case, the input to the control unit comprises some identifier of the motion pattern to use, which in turn is related to a corresponding mould configuration.

The actual motion of the distributor for a particular mould configuration may be either continuous such that the distributor smoothly moves from a start position to an end position in a continuous motion along a predefined path or pattern. It may also be defined as the distributor moving intermittently from on static position to the next along a predefined path or pattern until it has travelled from a start position to an end position. In the latter alternative the flowability properties of the curd will arrange for re-distribution of curd between the filling positions in the mould resulting in an even curd bed. The latter alternative has the effect that an erroneous amount of cheese curd in a particular position may be readily corrected by increasing or reducing the time spent in that particular position. The first alternative has the effect that an erroneous amount of cheese curd in a particular area may be readily corrected by increasing or reducing the speed of movement in that particular area. The two alternatives may be combined, and even if a continuous motion is used the motion may follow a varying speed profile. Either way, the path as well as the speed profile may be deduced by modelling or empirical means. For all alternatives it is beneficial if the end position is the same or close to the end position. This is due to the repetitive nature of the process; as soon as one mould is filled it is replaced by another mould to be filled, and so on.

To further elucidate the relative motion may be one of:

A continuous motion following a predetermined path. The speed profile may be constant apart from an acceleration in the beginning and a deceleration by the end. The speed profile may also vary, e.g. in the way that there are a number of positions where the speed is almost zero or where the speed is reduced significantly, and that there is an acceleration and deceleration between these positions.

An intermittent motion following a predetermined path. The speed profile contains an integer number of positions where the relative motion is zero, and between those positions there is an acceleration and a deceleration. This approach may be referred to as a "jump/stop" method.

A continuous or intermittent motion following an arbitrary path. Much like todays robotic lawn mowers or vacuum cleaners the relative motion may be arbitrary, following some basic rules for its motions. This approach is expected to fall short in situation where there is a short time period available for distribution. The arbitrary path may also be arbitrary in the sense that it is not preset, rather it could be controlled by e.g. an imaging device, wherein the control unit could use information from the imaging device or other suitable sensor arrangement such that it can guide the flow of curd to the position where it is needed.

In any of the embodiments the acceleration profile may be controlled to any desired profile within the physical boundaries, and in any embodiment it may be preferable to have a start position and a stop position which is predefined, and in absolute measures close to eachother and for example the same. This is an embodiment.

Apart from the above it may be desired to control the flow of curd coming out from the distribution outlet, and the flow rate may be controlled to a desired profile. In most embodiments, however, the flow rate is not controlled as a function of a particular part of the mould configuration, but it is rather governed by processes upstream the distributor.

In a practical situation there is a particular amount of time available for distribution exercise in order for the distribution and filling of a mould to accommodate to a particular flow rate for an entire cheese line. For any given situation there may therefore be an approach being more attractive than another.

The present disclosure may be particularly beneficial, or particular advantages may be made from a particular setup, namely that the curd is partially drained prior to entering the distributor, meaning that a significant portion of the whey previously present in a curd/whey mixture is drained of prior to arranging the curd mass in the mould configuration. This pre-draining is beneficial in that there is less whey to be removed from the mould configuration prior to and during pressing. There is however a challenge in that the pre-drained curd has a consistence that makes it less prone to obtain the correct distribution in an automatic fashion. This may me most readily understood if compared with a situation, as often used in prior art, where a curd/whey mixture having a considerably larger amount of whey included is arranged in a mould. In such a situation the curd/whey mixture may behave like a liquid and then the gravity will ensure an adequate or close to adequate distribution.

Further advantages of the predrained alternative is that there is less product splashing when filling into mould, that it is easier to predict the amount of curd having been delivered to the mould, and that it is possible to mix in ingredients at a late stage without losing a major part with the latter drained off whey. All of these features have been discussed in previous applications by the present applicant.

Figure 4A:
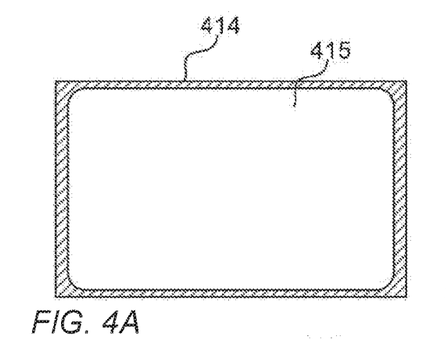
Figure 4B:
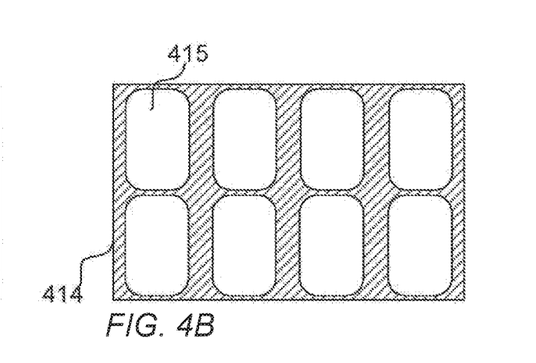
Figures 4C, 4D, 5A, 5B, 5C:
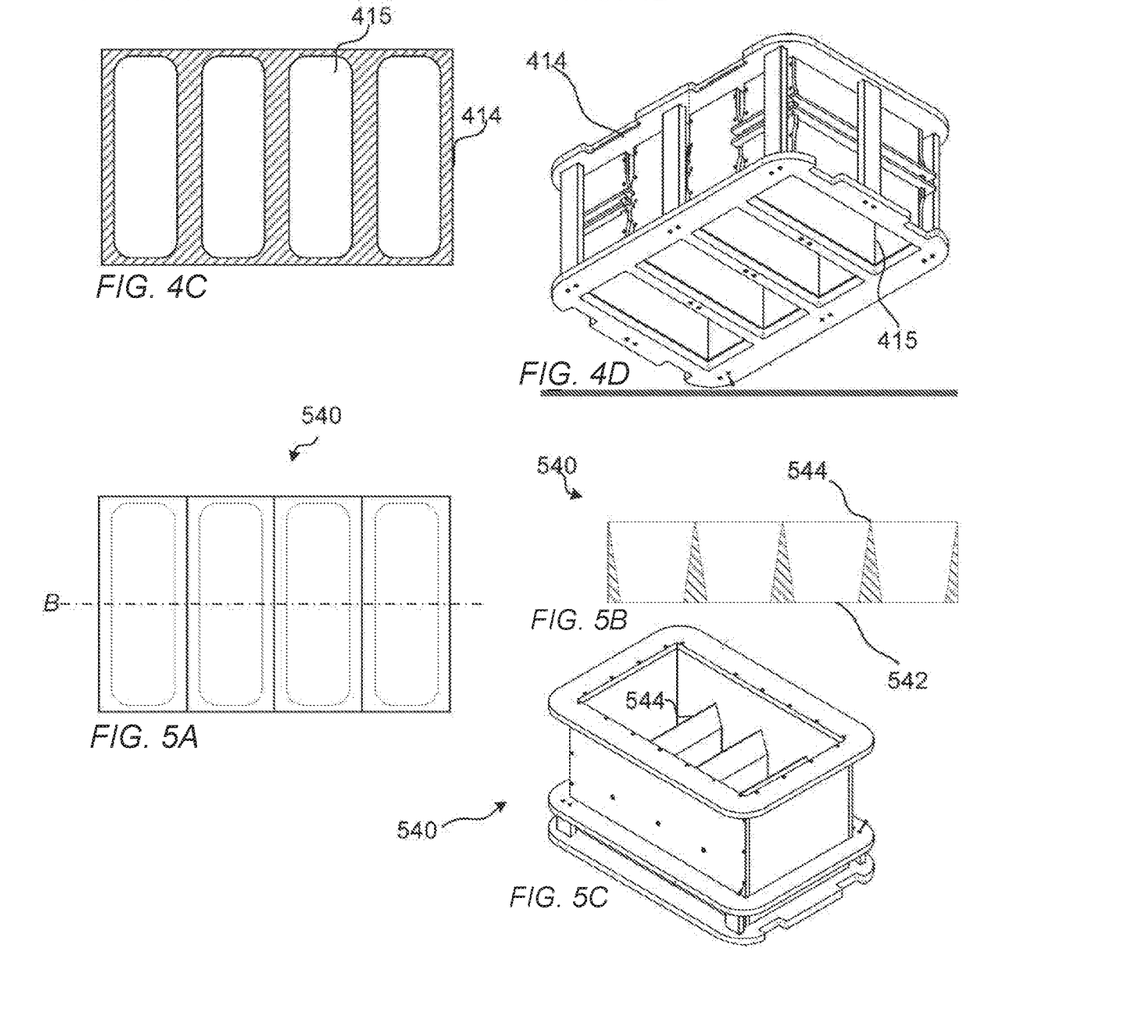

FIG. 4 illustrates some examples of mould configurations A, B and C, illustrating schematic plan views thereof. The simplified moulds 414 have one or more mould cavities 415 into which the curd is to be filled. FIG. 4D is a perspective view illustrating a slightly more elaborate view of the mould configuration of FIG. 4C. The present disclosure enables the use of more or less complex mould configurations in a cheese manufacturing machine, and in particular during continuous production in the cheese manufacturing machine. By observing the more complex ones it should be apparent that a method and a device for distributing the curd may be beneficial. A prior art solution, for the more complex configurations may be to fill the moulds manually, or to overfill all moulds and scrape of the surplus curd, if at all considered.

The versatility provided by the present disclosure may be further benefitted from by adding an insert 540 to the draining and moulding device 200. The insert is a component introduced between the distributor outlet and the mould configuration. The basic design of a particular insert more or less mimics the shape of a corresponding mould configuration, at least for the downstream outlet 542 of the insert 540. One purpose of the insert is to guide all of the curd into the mould configuration, and FIG. 5A-C illustrates an insert which may be used in combination with the mould configuration of FIG. 4C-D. FIG. 5A is a plan view showing the insert from above, and FIG. 5B is a cross sectional sideview of the same insert, both views being schematic. For a mould configuration including multiple moulds it is preferred that the inlet end of the insert displays an opening and sharp edges. "Sharp" in the sense that delimiters 544 between openings leading to different moulds are designed such as to reduce the risk of curd getting stuck and prevented from entering the insert and the mould below. In the disclosed embodiments this is accomplished by tapered ends of the delimiters. FIG. 5C is perspective view of an insert, illustrating how the general features of FIGS. 5A and 5B could be realized in a practical case, which could be used in a setup including the mould configuration shown in FIG. 4D. The type of mould configuration used may comprise a mould shaft, i.e. the framework of the mould, or a bottomless mould. What is shown in FIG. 4D is the mould shaft. To make the mould complete a mould bottom plate is added and later a mould lid. This has been disclosed in previous applications by the present applicant. A view of the components may be found in FIG. 8.

Figure 6:
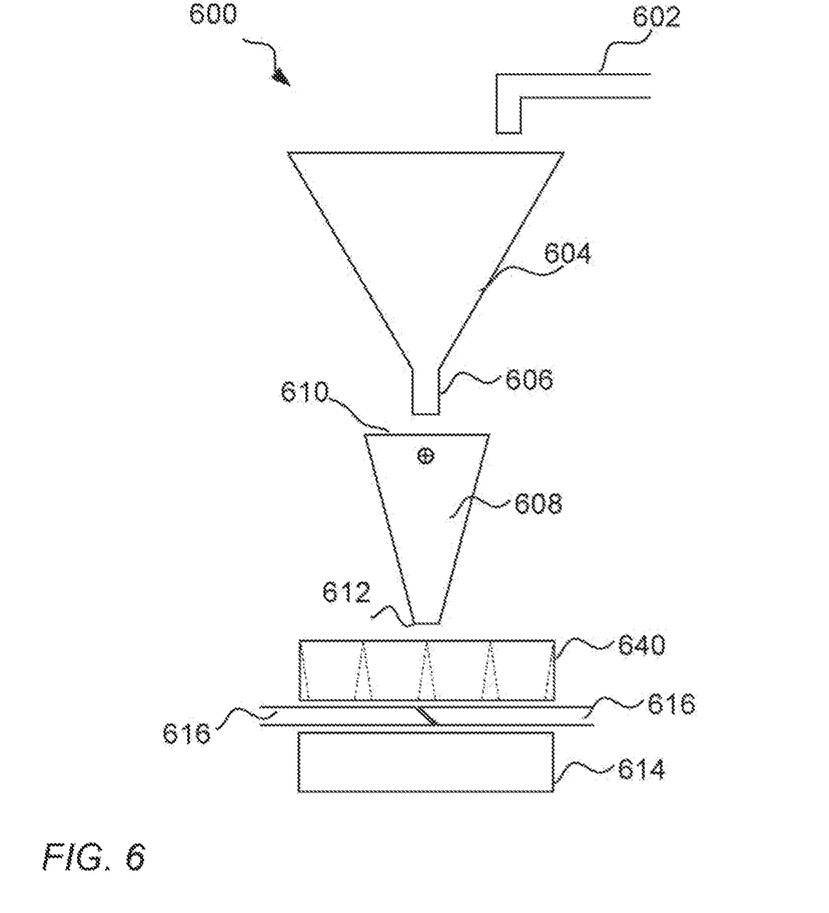
FIG. 6 is a schematic view of a curd distribution system similar to the ones of FIGS. 2 and 3, yet with still further features added.

To further improve the versatility of the present disclosure a component referred to as a sluice plate 616 may be arranged between the outlet of the distributor 604 and the mould configuration 614. Again, the reference numeral follow the logic that the first digit indicates the number of the drawing while the following two indicate the component in question, and the component may be the same or similar as components given the corresponding reference numeral in another drawing (disregarding the reference numerals of FIG. 1). If an insert 640 is arranged the preferred position would be between the insert 640 and the mould configuration 614. The sluice plate 616 is a retractable plate, or any set of retractable plates 616, which may be used to prevent a flow exiting from the distributor to reach the mould configuration 614. The ability to block the flow may be utilized in several situations, e.g. as a result from any type of error upstream or downstream the sluice plate 616. The sluice plate 616 may also be used as a valve controlling the flow, in an on and off fashion instead of having to have that functionality somewhere else in the system. That function enables to processing equipment upstream the distributor, in particular the flow from a buffer tank or cheese vat via the draining device leading to the distributor, to be in continuous operation. This facilitates an even flow of (predrained) curd through the distributor. In an operational situation where an even flow of predrained curd is fed to the distributor the sluice plate may be utilized during change from a filled mould configuration to an empty one. As soon as the first mould is filled in the desired way the sluice plate (or sluice plate arrangement if there are several components) blocks the flow. The filled first mould configuration is removed and an empty second mould configuration is introduced in the filling position. During the entire exchange the distributor 608 distributes the curd according to the motion pattern designated for the second mould configuration, yet the curd is placed on the sluice plate 616, within the insert 640 placed on top of the sluice plate 616, rather than in the mould 614. When the second mould configuration is in the correct position the sluice plate 616 is retracted and the curd falls finally to its intended position in the mould configuration 616. There may be a delay, such that the second mould configuration 614 has been correctly positioned for a while before the sluice plate 616 is retracted, or the retraction may be immediate. The retraction, or whatever motion is found suitable is controlled to the extent that the distribution of the curd onto the sluice plate 616 may be adjusted corresponding to the potential momentum inflicted onto the mass of curd resting on the sluice plate 616 as it is retracted, such that the distribution in the mould configuration is not negatively affected. The repositioning pattern of curd dropping down from the insert into the mould configuration is repeatable and the effect is predictable for setting the distribution pattern, which is most optimal if the sluice plate is always opening at a repeatable moment in the curd distribution sequence/pattern.

The use of the sluice plate may suitably be combined with the use of an insert as previously disclosed. It should also be mentioned that the sluice plate 616 may be used even in a situation where the distributor does not move at all, e.g. since the mould configuration is such that it does not require any distribution accomplished by relative motion. In such a case the sluice plate will still act as one enabler for allowing a continuous flow of curd out from the draining device and an intermittent flow of curd into the mould configuration. In such an embodiment the distributor may be simplified to a static component or even removed, and the present disclosure supports such an embodiment as well. More specifically such an embodiment could correspond to a device for filling cheese curd into a pressing mould comprising draining device having an outlet for continuous feed of curd, and a—a pressing-mould holder arranged below the outlet of the draining device, wherein a sluice plate is arranged between the outlet end of the draining device and the pressing-mould holder, the sluice plate comprising on or more retractable portions such that a flow of curd from the outlet end of the draining device to a mould configuration positioned by the pressing-mould holder may be blocked or allowed to passed, wherein the sluice plate is controlled to block the flow if a mould configuration is not present.

As an alternative to the insert a mould shaft could be used instead (i.e. the bottomless mould as described earlier). One effect of this is that logistics and maintenance relating to the insert as a separate component will be removed. As for the further components and features as described and claimed they may be combined freely with the simplified embodiment described above. E.g. an insert may be included, arranged between an outlet of the draining device and the sluice plate (or mould shaft), and/or a distributor—static or movable—may be added between an outlet of the draining device and any other downstream equipment, etc.

Figure 7:
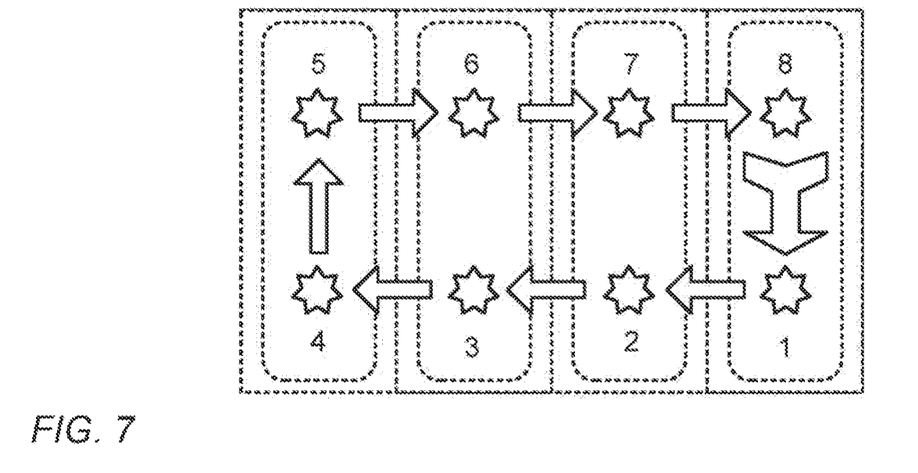
FIG. 7 illustrates a motion pattern which may be used for a distributor in a cheese line according to one or more embodiments of the present invention.

FIG. 7 illustrates an example of a motion pattern which may be used in for a distributor according to one or more embodiments according to the present disclosure. The corresponding insert is shown in dotted lines to explain the particular motion pattern. Each star represents a stop position in which the distributor stands still to allow for curd to drop into a particular area of the insert (in case an insert is arranged). The distributor jumps to subsequent stops (see numbering) at maximum speed. The speed of course depends on the drive system as well as other factors. In other embodiments, e.g. if there is a single mould cavity, there may not be any stops, or the velocity between stops may be less than maximum. The position numbered 8 is the last position and at that time the sluice plate, if any, will be closed such that the flow of curd may continue while the at that time full mould configuration may be replaced by a new one. It should be said that in other embodiments it may be desirable to go two full revolutions (1-2-3-4-5-6-7-8-1-2-3-4-5-6-7-8) before the mould configuration is full, or one full revolution and then some, e.g. 1-2-3-4-5-6-7-8-1. The numbers relate to positions as referred to in FIG. 7. Such considerations relate to the mould configuration and characteristics of the curd, etc. and the present disclosure enables any application in that sense. For a typical application the time available for distributing the mass of curd may be in the order of 20 seconds, and the number of stops, the time spent in each stop (if complete stops are used), the speed between stops etc are set within that time available.

Figure 8:
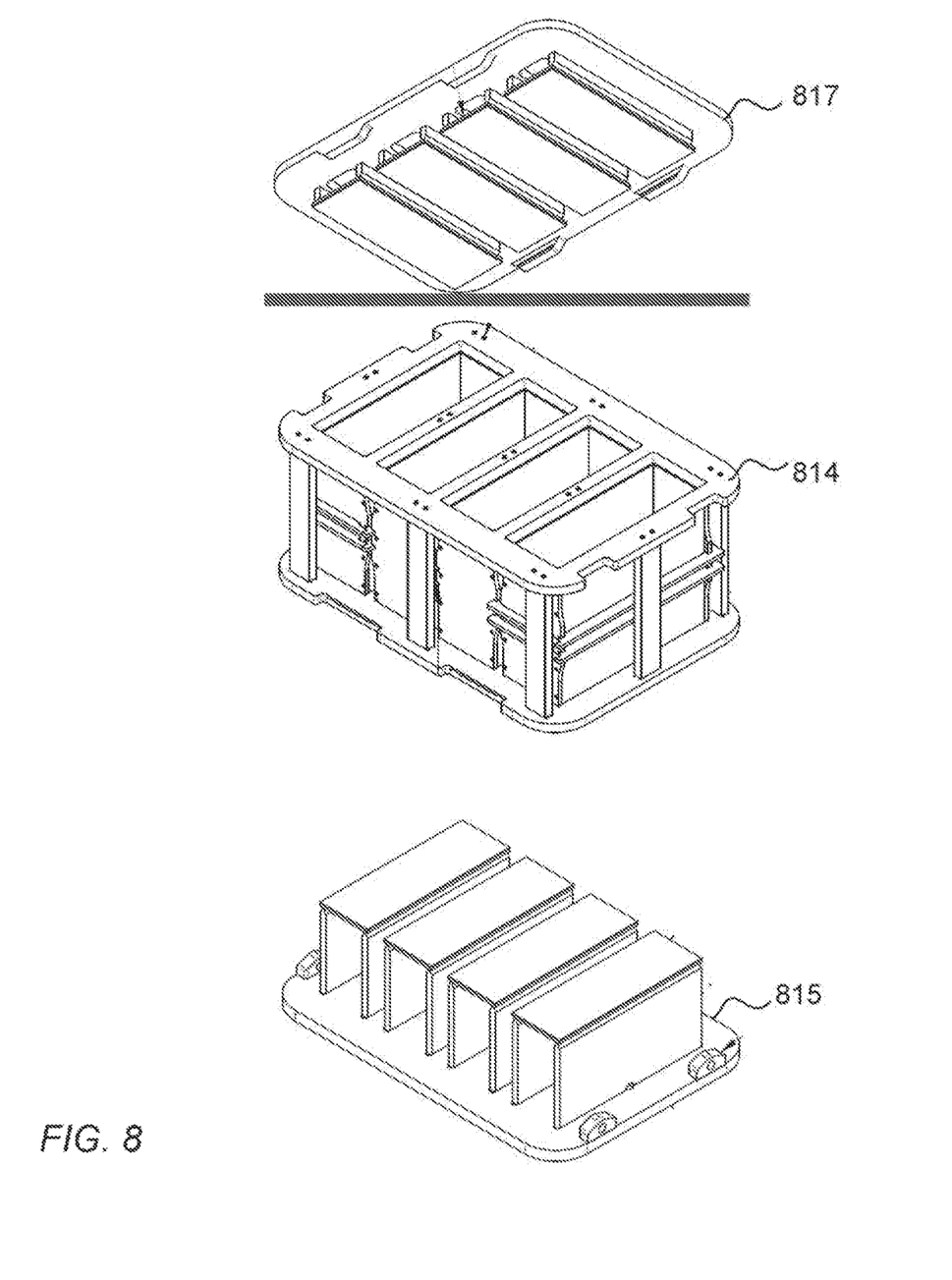
FIG. 8 is an exploded view in perspective of some components of a mould configuration.

For the sake of completeness some components of one example of a mould configuration is illustrated in the exploded view of FIG. 8. The mould configuration comprises a mould shaft 814, which is use is provided with a mould bottom plate 815 and a mould lid 817. When the mould is filled one end thereof should be open, meaning that the mould lid 817 is not added to the configuration until after filling. In other embodiments the mould lid and the mould bottom plate may be reversed as compared to what is disclosed in FIG. 8, meaning that 815 would designate the top lid and 817 the bottom plate, and in still other embodiments there is a fixedly arranged bottom in the mould configuration. Furthermore the mould configuration may be turned during handling thereof, renderering the definitions of top and bottom meaningless. Such details will not have any consequence for the application of the invention as disclosed herein, apart from the specific embodiment where the mould shaft is used as an insert, in which case the mould shaft should have two open ends to allow for the curd to pass.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different lterations, modifications and the like thereof will become apparent for those skilled in the art. The described embodiments are therefore not intended to limit the scope of the present disclosure.

The invention claimed is:

1. A device for filling cheese curd into a pressing mould comprising:
    a curd distributor, having an inlet end through which cheese curd may be received, and an outlet end through which the cheese curd may exit the curd distributor,
    a pressing-mould holder arranged below the outlet of the curd distributor,
    one or more drive units, configured to perform a relative motion between the curd distributor and the pressing mould holder based on input comprising an identifier of a pressing-mould configuration positioned by the pressing-mould holder,
    at least the outlet end of the curd distributor being movable in two spatial dimensions orthogonal to a gravitational force acting on the cheese curd and leaving the outlet of the curd distributor, and
    a linkage coupled to a drive shaft to effect motion of the outlet end of the curd distributor around a first axis and another drive shaft is arranged to effect a tilt of the outlet end of the curd distributor around a second axis, the tilt of the outlet end of the curd distributor occurring independently from movement of the curd distributor in the two spatial dimensions orthogonal to the gravitational force, and
    the curd distributor being funnel shaped with the inlet end being wider than the outlet end.

2. The device of claim 1, wherein the pressing-mould holder is movable in one or two dimensions residing in a plane orthogonal to a gravitational force acting on the cheese curd leaving the outlet of the curd distributor.

3. The device of claim 1, wherein an insert is arranged between the outlet end of the curd distributor and the pressing-mould holder, the insert mimicking a mould-cavity setup in a pressing-mould configuration positioned by the pressing-mould holder.

4. The device of claim 3, wherein the insert is configured to follow any motion performed by the pressing-mould holder.

5. The device of claim 3, wherein the insert has delimiters tapering off in a narrowing manner in a direction in which the curd flows.

6. The device of claim 1, wherein a sluice plate is arranged between the outlet end of the curd distributor and the pressing-mould holder, the sluice plate comprising on or more retractable portions such that a flow of curd from the outlet end of the curd distributor to a mould configuration positioned by the pressing-mould holder is alternatively blocked or allowed to passed, wherein the sluice plate is controlled to block the flow if a mould configuration is not present.

7. The device of claim 6, wherein the sluice plate is arranged downstream any insert arranged between the outlet end of the curd distributor and the pressing-mould holder, enabling a continuous flow of curd to the insert and a controlled discontinuous flow into the mould configuration.

8. The device of claim 1, wherein a supply line for supplying curd to the inlet end of the curd distributor is configured to provide a continuous flow of curd.

9. The device of claim 1, wherein an interior of the curd distributor is profiled.

10. The device of claim 1 wherein the input comprises a cheese recipe.

11. A system for filling cheese curd into a pressing mould comprising:
    an inlet pipe comprising an outlet port, the inlet pipe being configured to dispense cheese curd from the outlet port;
    a draining device comprising an open upper inlet and an open outlet port, the draining device being conical, the draining device positioned directly below the inlet pipe so that the cheese curd dispensed from the inlet pipe flows directly into the open upper inlet of the draining device and then flows vertically downwards through the draining device and out from the open outlet port of the draining device;
    a curd distributor comprising an inlet end through which cheese curd may be received and an outlet end through which the cheese curd may exit the curd distributor, the curd distributor being funnel shaped with the inlet end being wider than the outlet end, the curd distributor being positioned directly below the draining device so that the cheese curd flowing out from the open outlet port of the draining device flows directly into the inlet end of the curd distributor;
    a pressing-mould holder arranged below the outlet end of the curd distributor so that the cheese curd exiting the curd distributor flows into the pressing-mould holder;
    a first drive shaft connected to the curd distributor, the first drive shaft being configured to move the outlet end of the curd distributor in two spatial dimensions orthogonal to a gravitational force acting on the cheese curd leaving the outlet end of the curd distributor;
    a second drive shaft connected to the curd distributor, the second drive shaft being configured to tilt the outlet end of the curd distributor; and
    the second drive shaft is coaxial with the first drive shaft, the second drive shaft extending through an interior of the first drive shaft.

12. A system for filling cheese curd into a pressing mould comprising:
- an inlet pipe comprising an outlet port, the inlet pipe being configured to dispense cheese curd from the outlet port;
- a curd distributor comprising an inlet end through which cheese curd may be received and an outlet end through which the cheese curd may exit the curd distributor, the curd distributor being positioned below the inlet pipe so that the cheese curd flowing from the outlet port of the inlet pipe flows into the inlet end of the curd distributor, the curd distributor being funnel shaped with the inlet end being wider than the outlet end;
- a pressing-mould holder arranged below the outlet end of the curd distributor so that the cheese curd exiting the curd distributor flows into the pressing-mould holder;
- an insert is arranged between the outlet end of the curd distributor and the pressing-mould holder, the insert having a mould-cavity configuration that matches the pressing-mould holder, the insert comprising a plurality of sharp-edged delimiters that taper from a bottom of the insert toward the top of the insert;
- a first drive shaft connected to the curd distributor at two connection points circumferentially opposite one another, the first drive shaft being configured to move the outlet end of the curd distributor in two spatial dimensions orthogonal to a gravitational force acting on the cheese curd leaving the outlet end of the curd distributor;
- a second drive shaft connected to the curd distributor via a linkage at a linkage connection point, the second drive shaft being configured to tilt the outlet end of the curd distributor;
- the linkage connection point being closer to the outlet end of the curd distributor than the two connection points; and
- the curd distributor being unsupported other than at the two connection points and the linkage connection point.

13. The system according to claim 12, wherein
the second drive shaft is coaxial with the first drive shaft, and
the second drive shaft extends through an interior of the first drive shaft.

* * * * *